United States Patent
Gerlind

(10) Patent No.: US 7,255,368 B2
(45) Date of Patent: Aug. 14, 2007

(54) APPARATUS FOR STEERING COLUMN TILT AND TELESCOPE FUNCTION

(75) Inventor: Kiupel Gerlind, Laingsburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 431 days.

(21) Appl. No.: 10/864,003

(22) Filed: Jun. 9, 2004

(65) Prior Publication Data
US 2005/0275206 A1 Dec. 15, 2005

(51) Int. Cl.
*B62D 1/18* (2006.01)
(52) U.S. Cl. ...................................... 280/775
(58) Field of Classification Search ................ 280/775; 74/493; 464/140, 162
See application file for complete search history.

(56) References Cited

U.S. PATENT DOCUMENTS

| RE34,359 | E | * | 8/1993 | Matsumoto et al. | .......... 74/493 |
| 6,079,743 | A | | 6/2000 | Grams | |
| 6,390,505 | B1 | * | 5/2002 | Wilson | ....................... 280/775 |
| 6,711,965 | B2 | * | 3/2004 | Tomaru et al. | ............... 74/493 |

* cited by examiner

*Primary Examiner*—Faye M. Fleming
(74) *Attorney, Agent, or Firm*—Michael D. Smith

(57) ABSTRACT

The invention provides an apparatus for adjusting a position of a steering wheel. The invention includes a steering column for supporting the steering wheel. A telescoping mechanism and a tilting mechanism are associated with the steering column to move the steering column. The invention also includes a motor having a rotatable shaft for generating a moving force. A first linkage is selectively engageable with the rotatable shaft to transmit the moving force to the telescoping mechanism. A second linkage is selectively engageable with the rotatable shaft to transmit the moving force to the tilting mechanism.

20 Claims, 5 Drawing Sheets

APPARATUS FOR STEERING COLUMN TILT AND TELESCOPE FUNCTION

FIELD OF THE INVENTION

The invention relates to an apparatus for transmitting a moving force from a motor to first and second mechanisms and more particularly the invention relates to an apparatus for transmitting a moving force between a motor and tilting mechanism and between the motor and a telescoping mechanism of a steering column.

BACKGROUND OF THE INVENTION

Steering columns are provided with telescoping mechanisms and tilt mechanisms to adjust a position of a steering wheel. Telescoping steering columns include first and second members telescopically engaged with one another. The telescoping mechanism moves the first and second members relative to one another to extend or retract the steering wheel. Tilting mechanisms move the first and second member about a pivot axis. Alternatively, the steering column can include a third member that is pivotally connected to an end of one of the first and second members. The pivot axis for tilting movement is defined between the third member and the corresponding end of the first or second member.

SUMMARY OF THE INVENTION AND ADVANTAGES

The invention provides an apparatus for adjusting a position of a steering wheel. The invention includes a steering column for supporting the steering wheel. A telescoping mechanism and a tilting mechanism are associated with the steering column to move the steering column. The invention also includes a motor having a rotatable shaft for generating a moving force. A first linkage is selectively engageable with the rotatable shaft to transmit the moving force to the telescoping mechanism. A second linkage is selectively engageable with the rotatable shaft to transmit the moving force to the tilting mechanism.

In the exemplary embodiments of the invention, the first and second linkages are supported by a common support member that is moved by a single moving device. As result, the complexity, weight and cost of the power-transmitting system is reduced. Also, the efficiency of the motor is increased in that the motor will experience less down time.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
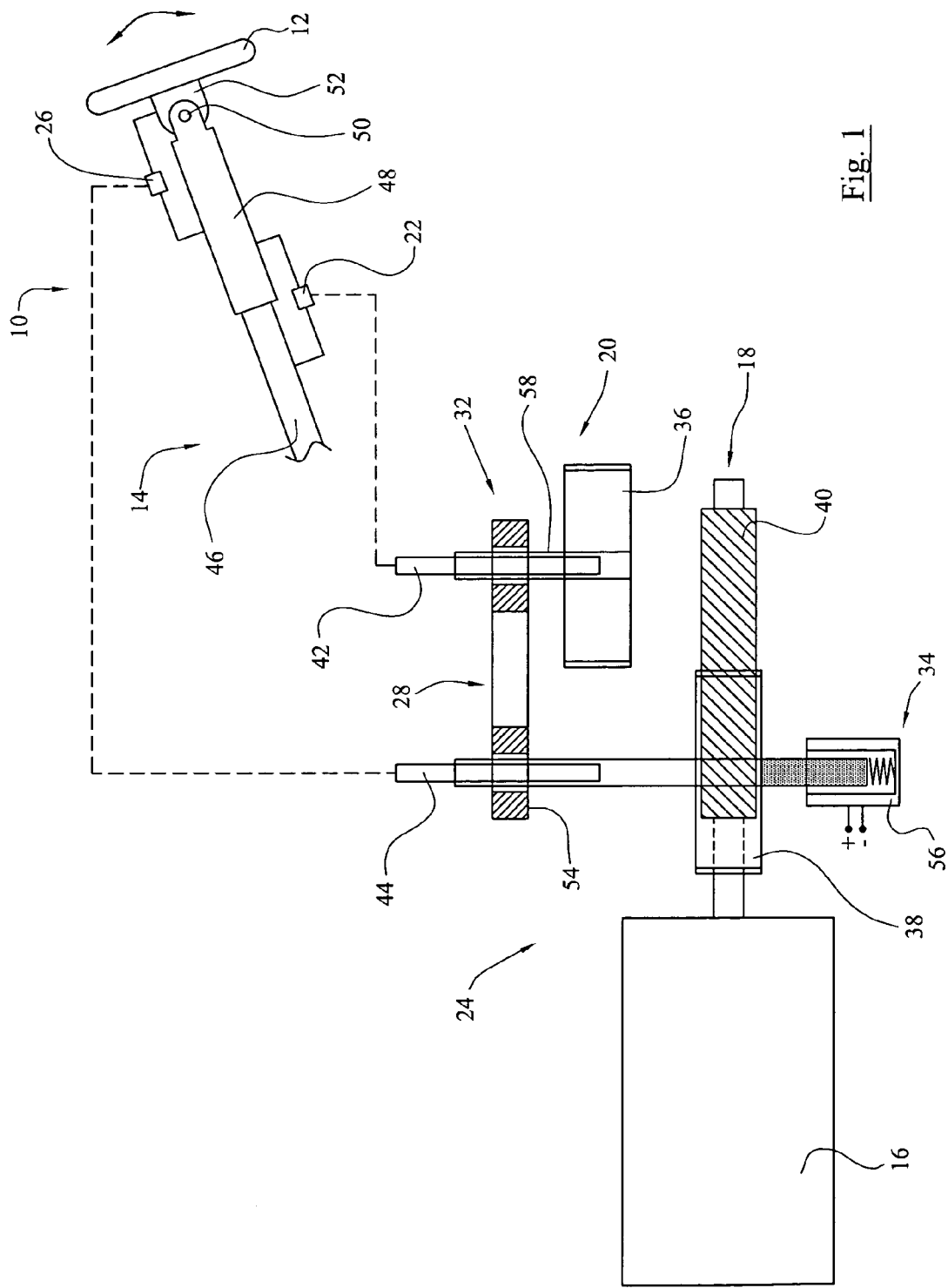
FIG. 1 is a schematic view of a first exemplary embodiment of the invention.

A plurality of different embodiments of the invention are shown in the Figures of the application. Similar features are shown in the various embodiments of the invention. Similar features have been numbered with a common-to-reference numeral and have been differentiated by a third digit placed before the two common digits. Similar features are structured similarly, operate similarly, and/or have the same function unless otherwise indicated. Furthermore, particular features of one embodiment can replace corresponding features in another embodiment unless otherwise indicated by the drawings or this specification.

Figure 2:
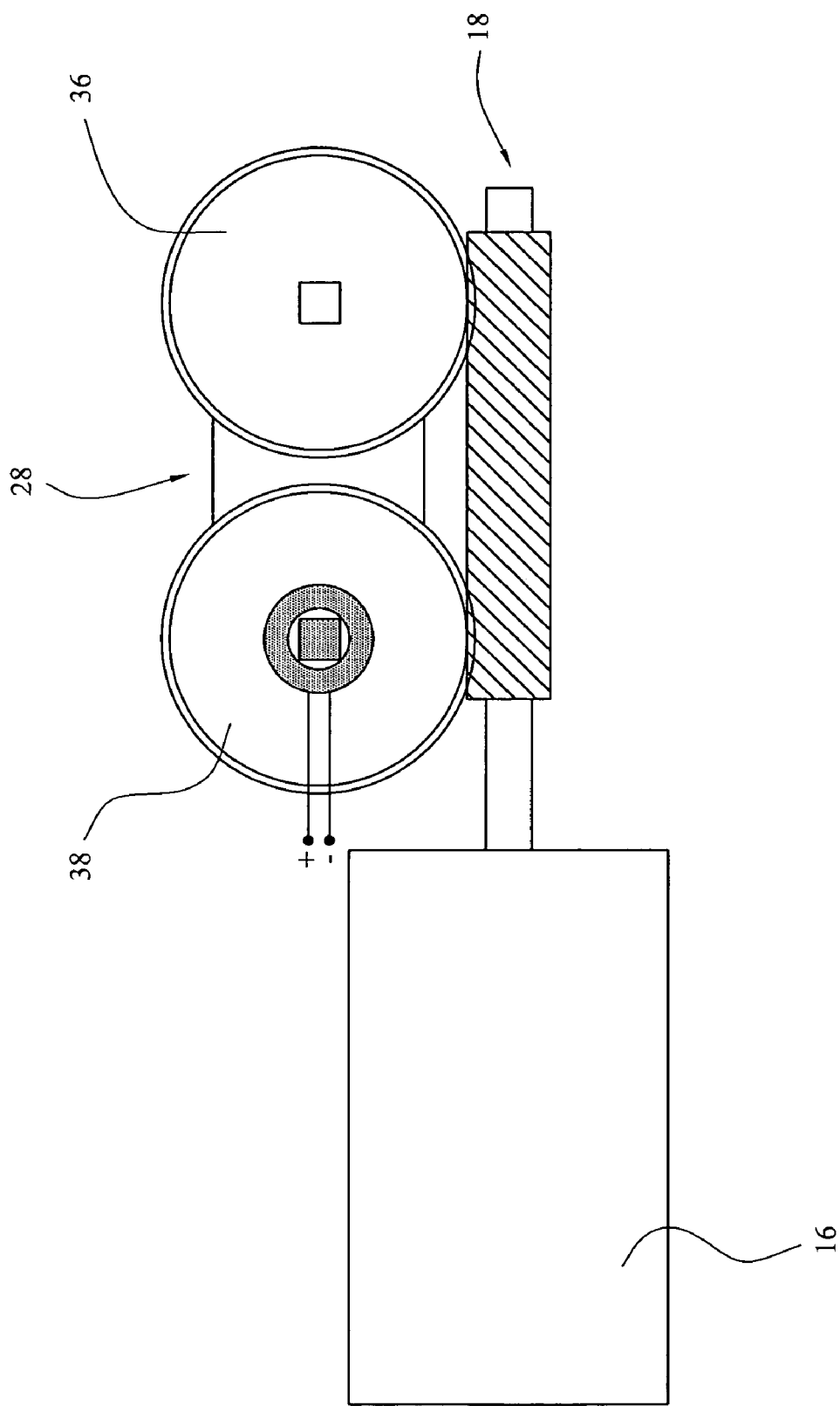
FIG. 2 is a side view of a motor, a first linkage and a second linkage of the first embodiment of the invention.
Figure 3:
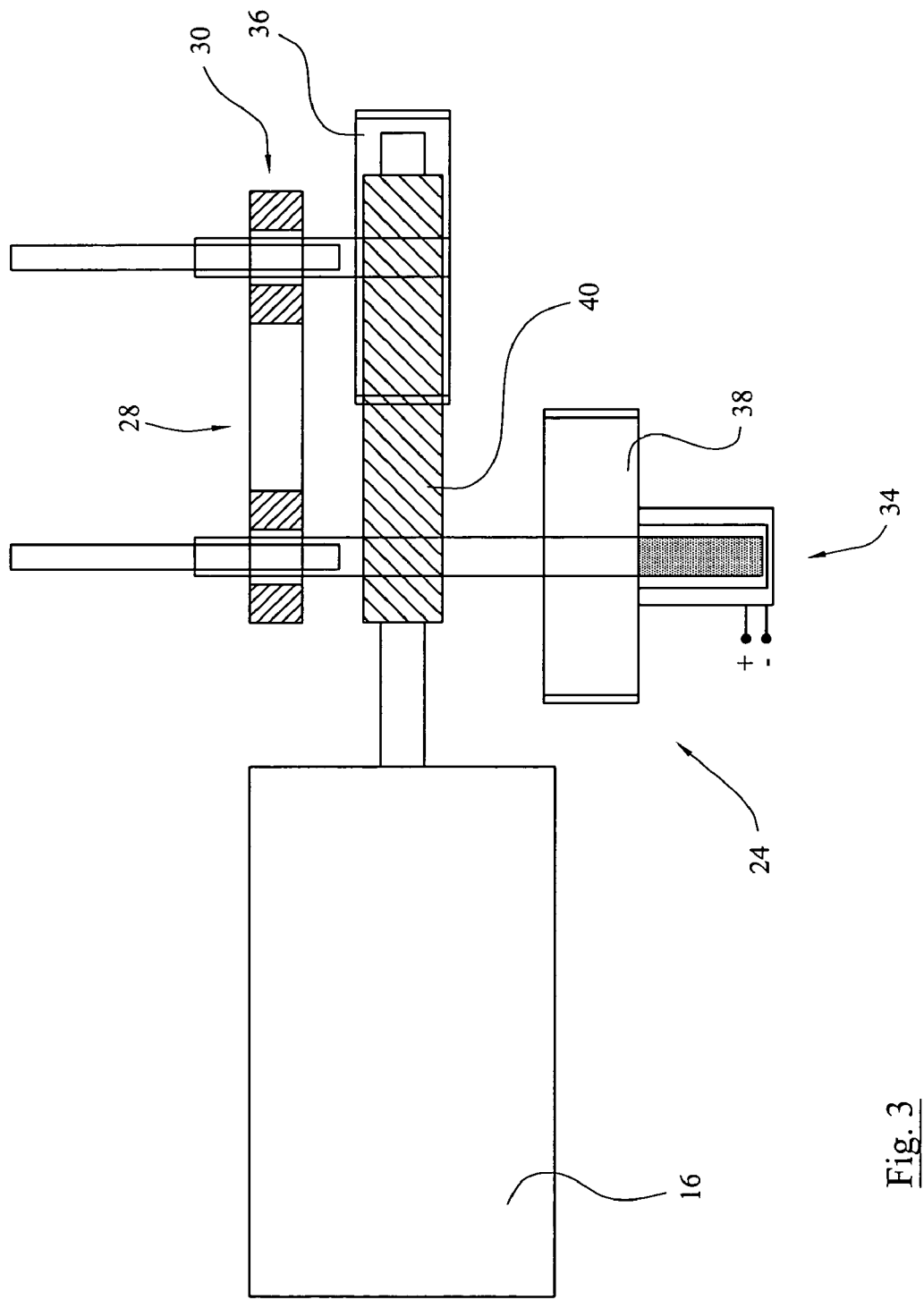
FIG. 3 is a top view of the motor, the first linkage and the second linkage of the first embodiment of the invention.

Referring now to FIGS. 1-3, in a first exemplary embodiment of the invention, an apparatus 10 includes a steering column 14 for supporting a steering wheel 12. The steering column 14 includes first and second members 46-48 disposed in telescoping relation and defines a pivot access 50. The steering column 14 also includes a steering wheel supporting portion 52 for engaging the steering wheel 12.

The apparatus 10 also includes a telescoping mechanism 22 associated with the steering column 14. The telescoping mechanism 22 moves the first and second members 46, 48 relative to one another to adjust the telescopic position of the steering wheel 12. The apparatus 10 also includes a tilting mechanism 26 associated with the steering column 14. The tilting mechanism 26 pivots the steering wheel supporting portion 52 about the pivot access 50.

The apparatus 10 also includes a motor 16 including a rotatable shaft 18 for generating a moving force. The motor 16 can be mounted to the steering column 14 or could be spaced from the steering column 14. The shaft 18 defines a worm gear 40. In alternative embodiments of the invention, the shaft 18 could define a spur gear, a bevel gear, a helical gear, or any other outer surface to transmit the moving force generated by the motor 16.

The apparatus 10 also includes a first linkage 20 selectively engageable with the shaft 18 to transmit the moving force to the telescoping mechanism 22. The first linkage 20 of the first exemplary embodiment of the invention includes a worm gear 36 that can be moved in and out of engagement with the worm gear 40 defined by the shaft 18. FIG. 1 shows the worm gear 36 out of engagement with the worm gear 40 and FIG. 3 shows the worm gear 36 engaged with the worm gear 40. In alternative embodiments of the invention, the first linkage 20 could include a spur gear, a bevel gear, a helical gear, or any other surface for engaging the shaft 18 to transmit the moving force generated by the motor 16.

The apparatus 10 also includes a second linkage 24 selectively engageable with the shaft 18 to transmit the moving force to the tilting mechanism 26. The second linkage 24 of the first exemplary embodiment of the invention includes a worm gear 38 that can be moved in and out of engagement with the worm gear 40 defined by the shaft 18. FIG. 3 shows the worm gear 38 out of engagement with the worm gear 40 and FIG. 1 shows the worm gear 38 engaged with the worm gear 40. In alternative embodiments of the invention, the second linkage 24 could include a spur gear, a bevel gear, a helical gear or any other surface to engage the shaft 18 and transmit the moving force generated by the motor 16.

The first and second worm gears 36, 38 extend parallel to one another. Also, the first and second worm gears 36, 38 are longitudinally offset with respect to one another. The first and second linkages 20, 24 also include respective first and second cables 42, 44 extending to the telescoping mechanism 22 and the tilting mechanism 26. The cables 42, 44 include an inner cable member and an outer sheath. The inner cable member is rotatable relative to the sheath. The inner cable members rotate in response to rotation of the worm gears 36, 38 respectively.

The apparatus 10 of the first exemplary embodiment of the invention includes a support member 28 supporting both of the first and second linkages 20, 24. The first and second linkages 20, 24 are rotatably supported by the support member 28, being rotatable with respect to the support member 28 and with respect to one another. The first and second linkages 20, 24 are fixed with respect to the support member 28 relative to translating movement. The support member 28 is movable between a first position 30, best shown in FIG. 3, and a second position 32, best shown in FIG. 1. When the support member 28 is in the first position 30, the first linkage 20 is engaged with the shaft 18 to transmit the moving force to the telescoping mechanism 22. When the support member 28 is in the second position 32, the second linkage 24 is engaged with the shaft 18 to transmit the moving force to the tilting mechanism 26. Each of the first and second worm gears 36, 38 is disposed on a first side 54 of the support member 28.

The apparatus 10 of the first exemplary embodiment of the invention also includes a moving device 34 associated with the support member 28 to move the support member 28 between the first and second positions 30, 32. In the first exemplary embodiment of the invention, the device 34 is directly associated with the second linkage 24 to move the support member 28 between the first and second positions 30, 32. In other words, the moving device 34 is spaced from the support member 28 in the first exemplary embodiment of the invention. The moving device 34 includes a solenoid 56. The second linkage 24 can rotate relative to the solenoid 56 and translate over a predetermined range relative to the solenoid 56. In an alternative embodiment of the invention, the moving device 34 could be a Nitinol wire that expands when heated.

In operation of the first exemplary embodiment, a driver of the vehicle can elect to adjust the telescopic position or the tilt position of the steering wheel 12. If the driver desires to change the telescopic position of the steering wheel 12, the solenoid 56 is engaged and retracts the second linkage 24 to move the support member 28 to the first position 30. The worm gear 36 meshes with the worm gear 40 and rotates in response to rotation of the shaft 18. The cable member of the cable 42 rotates and transmits moving force to the telescoping mechanism 22.

Meshing of the teeth of the worm gear 36 and the worm gear 40, and between the worm gears 38, 40, can be enhance in alternative embodiments of the invention. For example, meshing engagement can be enhanced by forming a tapered tooth shape on both the worm 36 and the worm 40. The shape could be conical, spherical, a taper on the left and right side of each tooth, or a taper on one side of the tooth extending over the thickness of the tooth. Alternatively, a flexible coupling can be disposed between the solenoid 56 and the second linkage 24 to allow the support member 28 to move parallel to the shaft 18 while the worm 36 and the worm 40 are meshing. Alternatively, the motor 16 could be engaged at a relatively low revolution per minute while the worm 36 engages the worm 40. Alternatively, the apparatus 10 can include a controller communicating with a plurality of sensors to synchronize the position of the worm 36 and the worm 40. Alternatively, the worm 40 can be movably disposed on the shaft within a predetermined range. Similarly, the worm 36 can be movably disposed on a shaft 58 within a predetermined range. The predetermined ranges of one or both of the worm 36 and worm 40 can allow the worms 36 and 40 to slide into a meshing engagement.

The apparatus 10 could also include a controller communicating with sensors mounted on the motor 16 and on the worm gears 36, 38 to enhance meshing engagement between the worm gears 36, 40 and/or the worm gears 38, 40. For example, the controller can determine the precise angular positions of the shaft 18 and the worm gears 36, 38 to coordinate meshing engagement. The controller can be recalibrated by running the motor 16 to a hard stop. Alternatively, magnets can be molded inside the worms 36, 38 to sense the tilting position and telescopic position of the steering wheel 12. The controller can also communicate with the solenoid 56 and determine the tilt position and the telescopic position of the steering wheel 12.

Figure 4:
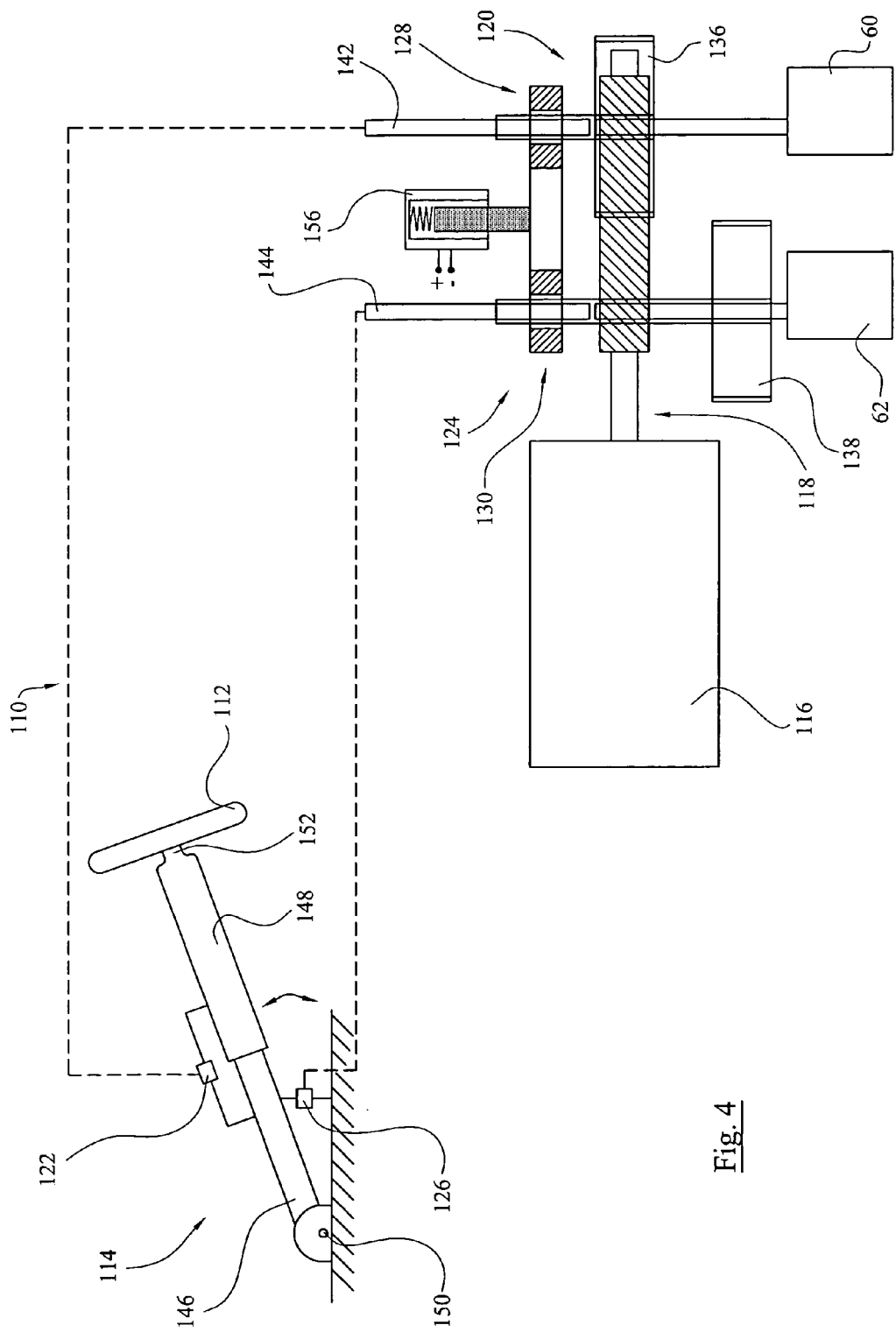
FIG. 4 is a schematic view of a second exemplary embodiment of the invention.
Figure 5:
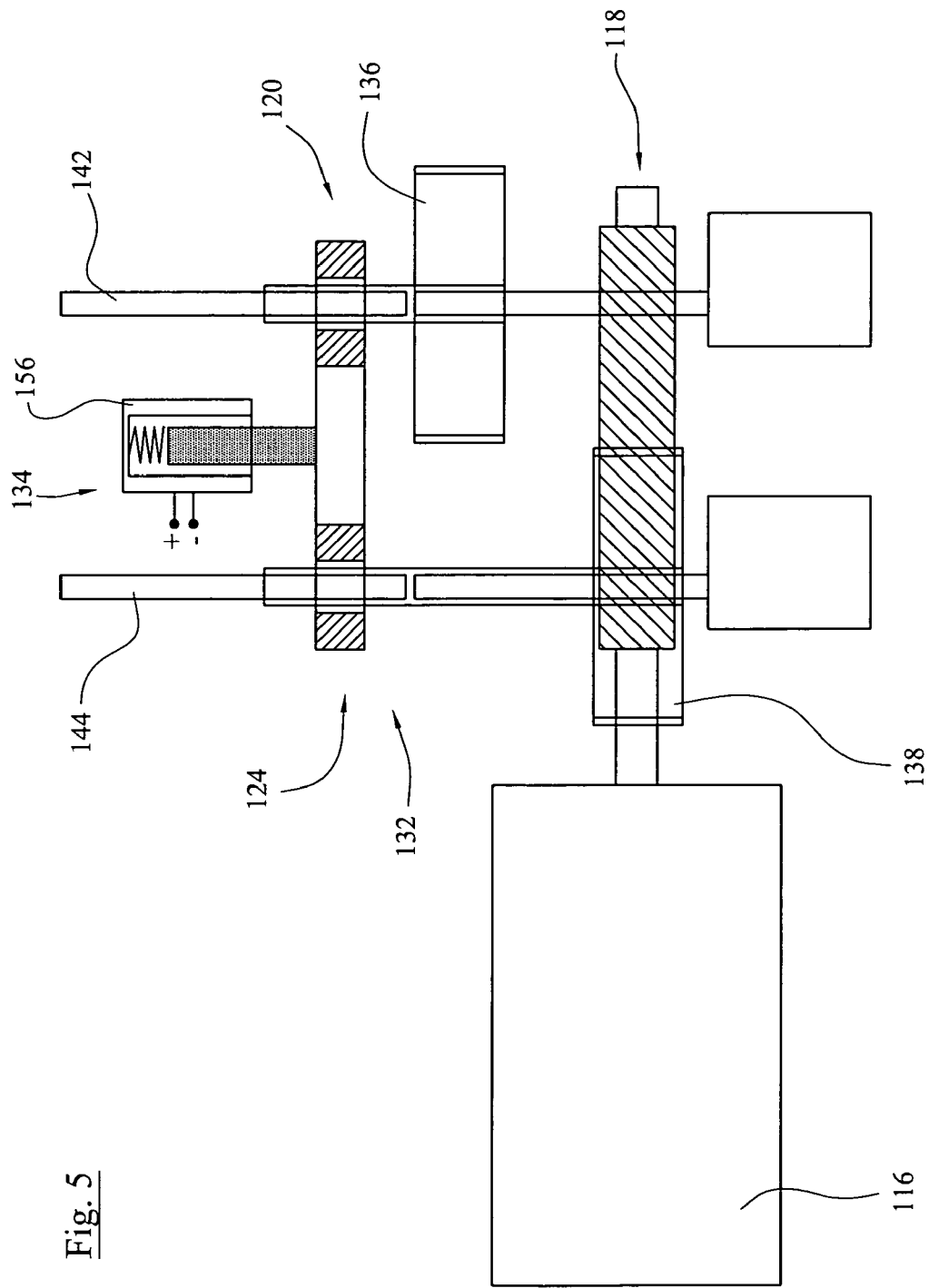
FIG. 5 is a top view of the motor, the first linkage and the second linkage of the second embodiment of the invention

Referring now to FIGS. 4 and 5, in a second exemplary embodiment of the invention, an apparatus 110 includes a steering column 114 for supporting a steering wheel 112, a telescoping mechanism 122 associated with the steering column 114, a tilting mechanism 126 associated with the steering column 114, a motor 116 including a rotatable shaft 118 for generating a moving force, a first linkage 120 selectively engageable with the shaft 118 to transmit the moving force to the telescoping mechanism 122, and a second linkage 124 selectively engageable with the shaft 118 to transmit the moving force to the tilting mechanism 126. The first and second linkages 120, 124 include first and second respective worm gears 136, 138 and the shaft 118 defines a third worm gear 140. The first and second linkages 120, 124 also include respective rotatable cables 142, 144. A pair of resistive sensors 60, 62 are associated with the cables 142, 144, respectively.

The steering column 114 includes first and second members 146, 148 disposed in telescoping relation, a pivot axis 150, and a steering wheel supporting portion 152. The telescoping mechanism 122 is operable to move the first and second members 146, 148 relative to one another. The tilting mechanism 126 is operable to pivot the steering wheel supporting portion 152 relative to the pivot access 150.

The apparatus 110 also includes a support member 128 supporting both of the first and second linkages 120, 124. The support member 128 is movable between a first position 130 and a second position 132. A moving device 134 having a solenoid 156 is directly associated with a support member 128 to move the support member 128 between the first and second positions 130, 132.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for adjusting a position of a steering wheel comprising:
   a steering column for supporting a steering wheel;
   a telescoping mechanism associated with said a steering column;

a tilting mechanism associated with said a steering column;

a motor including a rotatable shaft for generating a moving force;

a first linkage selectively engageable with said rotatable shaft to transmit said moving force to said telescoping mechanism; and a second linkage selectively engageable with said rotatable shaft to transmit said moving force to said tilting mechanism.

2. The apparatus of claim 1 further comprising a support member supporting both of said first and second linkages and moveable between a first position and a second position wherein said first linkage being engaged with said shaft to transmit said moving force when said support member is in said first position and wherein second linkage being engaged with said shaft to transmit said moving force when said support member is in said second position.

3. The apparatus of claim 2 further comprising a moving device associated with said support member to move said support member between said first and second positions.

4. The apparatus of claim 2 further comprising a moving device associated with one of said first and second linkages to move said support member between said first and second positions.

5. The apparatus of claim 1 wherein said first and second linkages include respective first and second worm gears and said shaft defines a third worm gear.

6. The apparatus of claim 5 wherein said first and second worm gears extend parallel to one another.

7. The apparatus of claim 6 wherein said first and second worm gears are offset from one another.

8. The apparatus of claim 1 wherein at least one of said first and second linkages include a rotatable cable for transmitting said moving force.

9. An apparatus for adjusting a position of a steering wheel comprising:

a steering column for supporting a steering wheel and having first and second members disposed in telescoping relation and defining a pivot axis and a steering wheel supporting portion;

a telescoping mechanism associated with said a steering column to move said first and second members relative to one another;

a tilting mechanism associated with said a steering column to pivot said steering wheel supporting portion about said pivot axis;

a motor including a rotatable shaft for generating a moving force;

a first linkage selectively engageable with said rotatable shaft to transmit said moving force to said telescoping mechanism; and a second linkage selectively engageable with said rotatable shaft to transmit said moving force to said tilting mechanism.

10. The apparatus of claim 9 wherein said first and second linkages are further defined as including respective first and second worm gears and said shaft defines a third worm gear.

11. The apparatus of claim 10 further comprising a support member supporting at least a portion of each of the first and second linkages such that said respective portions of said first and second linkages being rotatable relative to said support member and fixed for translating movement between first and second positions.

12. The apparatus of claim 11 wherein each of first and second worm gears is disposed on a first side of said support member.

13. The apparatus of claim 12 including a moving device having a solenoid for generating a second moving force.

14. The apparatus of claim 13 wherein said moving device is spaced from said support member.

15. The apparatus of claim 13 wherein said moving device is engaged with one of said first and second linkages.

16. An method for adjusting a position of a steering wheel comprising the steps of:

supporting a steering wheel with a steering column;

disposing a telescoping mechanism in engagement with said a steering column;

disposing a tilting mechanism in engagement with said a steering column;

generating a moving force with a motor having a rotatable shaft;

selectively engaging a first linkage with the rotatable shaft to transmit the moving force to the telescoping mechanism; and selectively engaging a second linkage with the rotatable shaft to transmit the moving force to the tilting mechanism.

17. The method of claim 16 including the step of:

supporting both of the first and second linkages with a support member translatable between first and second positions.

18. The method of claim 17 including the step of:

rotating at least a portion of one of the first and second linkages relative to the support member.

19. The method of claim 18 including the step of:

rotating at least a portion of one of the first and second linkages relative to one another.

20. The method of claim 19 including the step of:

disposing said first and second linkages in parallel with respect to one another.

* * * * *

UNITED STATES PATENT AND TRADEMARK OFFICE
CERTIFICATE OF CORRECTION

| | | |
|---|---|---|
| PATENT NO. | : 7,255,368 B2 | Page 1 of 1 |
| APPLICATION NO. | : 10/864003 | |
| DATED | : August 14, 2007 | |
| INVENTOR(S) | : Gerlind | |

It is certified that error appears in the above-identified patent and that said Letters Patent is hereby corrected as shown below:

On the title page

(75) Inventor, delete "Kiupel Gerlind" and insert therefor --Gerlind Kiupel--

Signed and Sealed this

Twenty-seventh Day of November, 2007

JON W. DUDAS
*Director of the United States Patent and Trademark Office*